United States Patent [19]

Johansen, Jr. et al.

[11] Patent Number: 5,362,322
[45] Date of Patent: Nov. 8, 1994

[54] COLOR EPOXY GROUT SYSTEM AND METHOD FOR USE

[75] Inventors: Charles J. Johansen, Jr., Katy; Robert L. Vecchio, Spring; Ernest D. Hollas, Kingwood, all of Tex.

[73] Assignee: C-Cure Chemical Company, Inc., Houston, Tex.

[21] Appl. No.: 628,402

[22] Filed: Dec. 17, 1990

[51] Int. Cl.$^5$ ............................................. C04B 14/36
[52] U.S. Cl. .................................. 106/802; 106/482; 106/712; 156/819; 156/823
[58] Field of Search ............... 106/712, 802, 819, 823, 106/314, 315, 482

[56] References Cited

U.S. PATENT DOCUMENTS

| | | | |
|---|---|---|---|
| 3,667,976 | 6/1972 | Tanner | 106/712 |
| 4,204,876 | 5/1980 | Bowden | 106/712 |
| 4,335,065 | 6/1982 | Ando | 264/87 |
| 4,443,567 | 4/1982 | Sternisa et al. | 523/211 |
| 4,495,228 | 1/1985 | Cornwell | 427/385.5 |
| 4,597,997 | 7/1986 | Weill | 427/288 |
| 4,650,751 | 3/1987 | Siegel et al. | 435/7 |
| 4,668,560 | 5/1987 | Kobayashi et al. | 428/195 |
| 4,717,016 | 1/1988 | Dalgleish | 206/0.5 |
| 4,813,000 | 3/1989 | Wyman et al. | 364/526 |
| 4,859,504 | 8/1989 | Rossiter et al. | 427/262 |
| 4,877,652 | 11/1989 | Sparling, II et al. | 427/264 |
| 4,911,642 | 3/1990 | Knowles | 434/84 |
| 4,946,505 | 8/1990 | Jungk | 106/712 |

Primary Examiner—Mark L. Bell
Attorney, Agent, or Firm—Hedman, Gibson & Costigan

[57] ABSTRACT

A multi-component settable epoxy blend for setting and grouting of ceramic tiles, pavers and quarry tiles, the first component comprising an epoxy resin and the second component comprising an epoxy hardener wherein one of the first or second components has a plurality of subcomponents, at least two of the subcomponents further comprising a color pigment additive which defines the same or different colors so that when the subcomponents are combined they produce a grout having a specific color shade selected by the user.

2 Claims, 5 Drawing Sheets

COLOR GUIDE

| | |
|---|---|
|  | 164 SILVER KING |
|  | 165 ENGLISH IVY |
|  | 166 WILD GINGER |
|  | 167 AZALEA |
|  | 168 WILD ONION |
|  | 169 TULIP |
|  | 170 BLUEBONNET |
|  | 171 SUNFLOWER |
|  | 172 HOLLY |
|  | 173 HONEYSUCKLE |
|  | 174 ARROWWOOD |
|  | 175 BUCKWHEAT |
|  | 176 CATTAIL |
|  | 177 CHOCOLATE LILY |
|  | 178 BLACK ORCHID |

| | 178 BLACK ORCHID | 177 CHOCOLATE LILY |
|---|---|---|
| 164 SILVER KING | 164 & 178 DUPLICATE COLOR | 164 & 177 |
| 165 ENGLISH IVY | 165 & 178 DUPLICATE COLOR | 165 & 177 |
| 166 WILD GINGER | 166 & 178 DUPLICATE COLOR | 166 & 177 |
| 167 AZALEA | 167 & 178 DUPLICATE COLOR | 167 & 177 |
| 168 WILD ONION | 168 & 178 DUPLICATE COLOR | 168 & 177 |
| 169 TULIP | 169 & 178 DUPLICATE COLOR | 169 & 177 |
| 170 BLUEBONNET | 170 & 178 DUPLICATE COLOR | 170 & 177 |
| 171 SUNFLOWER | 171 & 178 | 171 & 177 |
| 172 HOLLY | 172 & 178 | 172 & 177 |
| 173 HONEYSUCKLE | 173 & 178 | 173 & 177 |
| 174 ARROWWOOD | 174 & 178 DUPLICATE COLOR | 174 & 177 |
| 175 BUCKWHEAT | 175 & 178 DUPLICATE COLOR | 175 & 177 |
| 176 CATTAIL | 176 & 178 DUPLICATE COLOR | 176 & 177 |
| 177 CHOCOLATE LILY | 177 & 178 DUPLICATE COLOR | |

FIG. 3A

|  176 CATTAIL | 175 BUCKWHEAT | 174 ARROWWOOD | 173 HONEYSUCKLE | 172 HOLLY |
|---|---|---|---|---|
| 164 & 176 | 164 & 175 | 164 & 174 | 164 & 173 | 164 & 172 |
| 165 & 176 | 165 & 175 | 165 & 174 | 165 & 173 | 165 & 172 |
| 166 & 176 | 166 & 175 | 166 & 174 | 166 & 173 | 166 & 172 |
| 167 & 176 | 167 & 175 | 167 & 174 | 167 & 173 | 167 & 172 |
| 168 & 176 | 168 & 175 | 168 & 174 | 168 & 173 | 168 & 172 |
| 169 & 176 | 169 & 175 | 169 & 174 | 169 & 173 | 169 & 172 |
| 170 & 176 | 170 & 175 | 170 & 174 | 170 & 173 | 170 & 172 |
| 171 & 176 | 171 & 175 | 171 & 174 | 171 & 173 | 171 & 172 |
| 172 & 176 | 172 & 175 | 172 & 174 | 172 & 173 | |
| 173 & 176 | 173 & 175 | 173 & 174 | | |
| 174 & 176 | 174 & 175 | | | |
| 175 & 176 | | | | |

165 ENGLISH IVY — 164 & 165

166 WILD GINGER — 164 & 166 — 165 & 166

167 AZELEA — 164 & 167 — 165 & 167 — 166 & 167

168 WILD ONION — 164 & 168 — 165 & 168 — 166 & 168 — 167 & 168

169 TULIP — 164 & 169 — 165 & 169 — 166 & 169 — 167 & 169 — 168 & 169

170 BONNET — 164 & 170 — 165 & 170 — 166 & 170 — 167 & 170 — 168 & 170 — 169 & 170

171 SUNFLOWER — 164 & 171 — 165 & 171 — 166 & 171 — 167 & 171 — 168 & 171 — 169 & 171 — 170 & 171

COLOR EPOXY GROUT SYSTEM AND METHOD FOR USE

FIELD OF THE INVENTION

The present invention relates to a multi-component settable epoxy blend for setting and grouting of ceramic tile, pavers and quarry tiles over a wide variety of substrates subject to flexing, vibration and heavy usage.

BACKGROUND OF THE INVENTION

Setting and grouting materials are well known in the art for the installation of tiles and the like. Recently, colored grouting has become popular for a distinctive appearance. However, color grout is limited in available shades and the demand for shades other than primary or generic colors, i.e., green, blue, brown, is not great enough for distributors, dealers or stores to stock a variety of shades in a generic color. Even if sufficient demand existed, shelf space and storage considerations do not favor stocking a large variety of colors and shades.

Therefore, it is an object of the present invention to provide a multi-component setting and grouting system which is capable of producing a variety of color shades without a multitude of different color components.

It is a further object of the present invention to be able to mix the components in their own container for a grout system that is easy to use.

SUMMARY OF THE INVENTION

These and other objects of the present invention are achieved by a multi-component setting and grouting system comprising a first part comprising an epoxy resin and a second part comprising an epoxy hardener, one of said first part or said second part having a predetermined plurality of subparts, wherein at least two of said subparts further comprise a color pigment additive that defines the same or different colors which, when said subparts are combined, produce a specific color shade.

If the subparts with a color pigment additive each contain the same color pigment additive, then the color defined by the color pigment additive will be the color of the mixture. However, if the color pigment additive of each of the subparts are different, they will combine to produce a mixture having a shade different than the individual colors of the subparts. Therefore, a wide variety of shades can be produced by the combination of subparts in a limited number of different colors.

Similarly, the system can have three (3) components where the first component includes the epoxy resin, the second component includes the epoxy hardener and the third component comprises a plurality subparts including the filler and the color pigment additives.

The use of the subparts are preferred for color consistency of the grout or setting material.

Furthermore, one part or component of the system not having subparts preferably comes packaged in a container with a volume sufficient to hold that part and the total volume of all subparts of the other part(s) to allow mixing of all the parts in the container in which the one part is packaged.

BRIEF DESCRIPTION OF THE DRAWINGS

The present invention will be better understood when reviewed in conjunction with the accompanying drawings, which are not intended to limit the present invention in any manner whatsoever, wherein:

FIG. 3A–C are color grids of various color shades obtainable using subparts with color pigments relating to the color guide of FIG. 2.

DETAILED DESCRIPTION OF THE INVENTION

Figure 1:
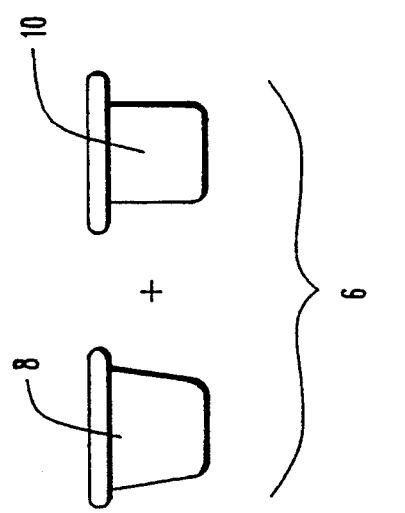
FIG. 1 is a diagram representing the color grout system of the present invention.
Figure 1:
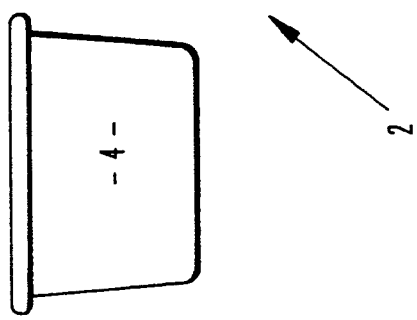

As shown in FIG. 1, the present system 2 is comprised of a first part 4 and a second part 6, said second part 6 having a first subpart 8 and a second subpart 10.

The first part 4 comprises an epoxy resin and silica filler reactive composition. The composition of the first part 4 preferably comprises a bisphenol A/epichlorohydrin resin (16.83 wt %), aliphatic glycidyl ether (4.21 wt %) and silica sand (78.96 wt %) in an amount totaling approximately 12.6 pounds. It has been found that SHELL EPON(R) RESIN 8132 is suitable for use as the bisphenol A/epichlorohydrin resin having NEODOL ® aliphatic glycidyl ether as a reactive diluent contained therein.

The preferred second part 6 comprises an epoxy hardener, silica filler and a color pigment additive comprising one or more color pigments. The composition of the second part 6 preferably comprises an aliphatic polyamine (66.44 wt %) and a silica sand/pigment additive combination (33.56 wt %) in an amount totaling approximately 0.6 pounds per each of two subparts 8 and 10. It has been found that PACIFIC ANCHOR CHEMICAL ANCAMIDE 501 is suitable as the aliphatic epoxy hardener.

The ratio of the amounts of bisphenol A/epichohydrin resin, aliphatic glycidyl ether and aliphatic polyamine to be combined must be carefully maintained wherein the resin to hardener ratio is critical. Also, the amount of silica filler in the first part 4 should be in a range to maximize volume without sacrificing strength.

On the other hand, the silica sand/pigment combination of the second part 6, although having a constant total, i.e., 33.56% wt, has a variable ratio of the amount of silica sand to pigment additive depending on the particular color desired. This variation is due to the need for specific amounts of various pigment(s) depending on color intensity, etc. The silica sand filler makes up for the variation to assure a total amount which is constant at 33.56% wt of the subparts 8 and 10.

The silica sand for use in either part 4 or 6 is preferably minimum 99% silicon dioxide of from about 60 to about 200 U.S. mesh.

The color pigment additives in the subparts 8 and 10 of the second part 6 are of the type comprising metal oxides, metal oxide silicates, naphthols, cromium oxides, nickel antimony titanium, titanium dioxide, alumino silicate and carbon black pigments. These pigments are preferred for use with tile settings because of their durability in wet environments, resistance to fading and chemical resistance.

Figure 2:
FIG. 2 is a color guide to the colors comprising any one subpart of part B of the color grout system.
Figure 2:
Figure 2:
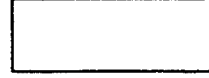
Figure 2:
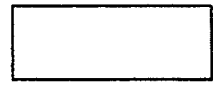
Figure 2:
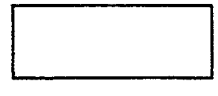
Figure 2:
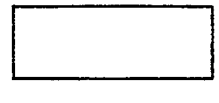
Figure 2:
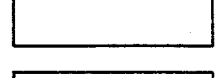
Figure 2:
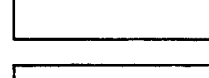
Figure 2:
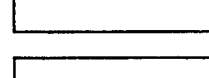
Figure 2:
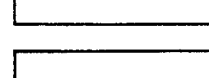
Figure 2:
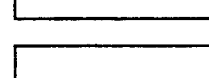
Figure 2:
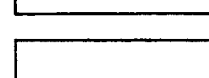
Figure 2:
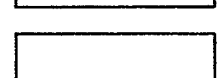
Figure 2:
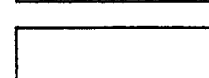
Figure 2:

The preferred colors of the subparts 8 and 10 are shown in FIG. 2. The color pigment additive for each color is listed below with the weight % of the specific pigments being the relative weight % of the second part 6, the remainder of the 33.56 weight % of the color pigment additive/silica sand combination being silica sand.

| COLOR | PIGMENT ADDITIVE | Weight % |
| --- | --- | --- |
| Silver King | Rutile Titanium Dioxide | 4.17 |
| | Black Oxide | 0.42 |
| | Yellow Oxide | 0.08 |
| English Ivy | Titanium Dioxide | 4.25 |
| | Black Oxide | 0.25 |
| | Chromium Oxide | 1.25 |
| | Yellow Oxide | 0.50 |
| Wild Ginger | Red Oxide | 0.83 |
| | Black Oxide | 0.83 |
| Azalea | Rutile Titanium Dioxide | 4.17 |
| | Black Oxide | 0.17 |
| | Red Oxide | 0.17 |
| | Yellow Oxide | 0.67 |
| Wild Onion | Rutile Titanium Dioxide | 4.17 |
| | Yellow Oxide | 0.25 |
| | Red Oxide | 0.25 |
| | Black Oxide | 0.08 |
| Tulip | Red Oxide | 2.80 |
| | Bright Red | 3.33 |
| Bluebonnet | Rutile Titanium Dioxide | 0.83 |
| | Ultra Marine Blue | 6.42 |
| | Black Oxide | 0.83 |
| Sunflower | Bright Yellow | 11.53 |
| Holly | Chromium Green | 14.78 |
| | Ultra Marine Blue | 8.87 |
| Honeysuckle | Titanium Dioxide | 4.17 |
| | Yellow Oxide | 0.42 |
| | Black Oxide | 0.08 |
| Arrowwood | Black Oxide | 0.58 |
| | Titanium Dioxide | 0.08 |
| Buckwheat | Titanium Dioxide | 4.17 |
| | Yellow Oxide | 0.92 |
| | Burnt Umber | 0.17 |
| | Black Oxide | 0.17 |
| Cattail | Rutile Titanium Dioxide | 1.25 |
| | Burnt Umber | 1.75 |
| | Black Oxide | 0.17 |
| Chocolate Lily | Black Oxide | 1.75 |
| | Burnt Umber | 1.25 |
| | Titanium Dioxide | 2.58 |
| Black Orchid | Carbon Black | 4.25 |

The industry standards for the foregoing color pigments are listed in the following table:

COLOR INDEX NUMBERS

Red Oxide=C.I. Pigment Red 101, C.I. No. 77491
Yellow Oxide=C.I. Pigment Yellow 42, C.I. No. 77492
Black Oxide=C.I. Pigment Black 11, C.I. No. 77499
Chronium Oxide=C.I. Pigment Green 17, C.I. No. 77288
Ultra Marine Blue=C.I. Pigment Blue 29, C.I. No. 77007
Carbon Black=C.I. Pigment Black 7, C.I. No. 77266
Bright Red=C.I. Pigment Red 170, C.I. No. 12475
Bright Yellow=C.I. Pigment Yellow 53, C.I. No. 77788
Burnt Umber=C.I. Pigment Brown 7, C.I. No. 77499
Titanium Oxide=C.I. Pigment White 6, C.I. No. 77891

In the preferred embodiment, the subparts 8 and 10 of the second part 6 each have one of the above color pigment additives for producing the desired color. Specific shades are created by the mixing of appropriate subparts 8 and 10. For example, when the first subpart 8 has the same color pigment additive as the second subpart 10, and the first and second subparts 8 and 10 are mixed with the first part 4 of the system 2, the color of the grout will be that shown in FIG. 2.

However, when the first subpart 8 has a color pigment additive different from the color pigment additive of the second subpart 10, and the first and second subparts 8 and 10 are mixed with the first part 4 of the system 2, the color of the grout will be an intermediate shade. The intermediate shade will be determined by the color pigment additive of each of the subparts 8 and 10, as shown in FIGS. 3A-C.

In FIGS. 3A-C, the preferred colors of the subparts 8 and 10 are on the horizontal and vertical axes and the shades produced by combination of the subparts 8 and 10 with the first part 4 are in the corresponding boxes of the grid. For example, the color grout created by the mixture of the first subpart 8 having the color pigment additive for Bluebonnet with the second subpart 10 having the color pigment additive for Tulip can be found by following the column for Bluebonnet down to its intersection with the row for Tulip.

The formulations for the first part 4 and each of the subparts 8 and 10 of the second part 6 of the system 2 are packed in individual sealed containers. The volume of the container of the first part 4 is sufficient to hold the volume of the composition of the first part 4 as well as the volume of composition of both subparts 8 and 10. Therefore, the composition of both subparts 8 and 10 are added directly to the container holding the first part 4 and mixed with the first part 4 without the need for a separate mixing vessel.

To prepare the color grout, the contents of the first subpart 8 and the second subpart 10 containing either the same or different color pigment additives are emptied into the container holding the first part 4. The contents are then mixed thoroughly to a homogeneous mixture. The color grout is best when used within about eighty (80) minutes after preparation.

Obvious variations to the above described invention will make themselves apparent to one skilled in the art. For example, the colors of the subparts can be any colors which can be combined to make a variety of color shades. Also, there can be more than two subparts comprising the second part of the system. The system can alternatively have a first part having subparts including the resin and the color pigment additives, or as another alternative can have three components wherein the first part includes the resin, the second part includes the hardener and the third part includes subparts including the filler and the color pigment additives. All such obvious variations are intended to be covered by the appended claims.

We claim:

1. A method for the preparation of a color grout and setting material comprising selecting a color from a color grid having axes with preselected colors, determining the component colors from the axes of the grid corresponding to the selected color, thoroughly mixing a prepackaged composition comprising an epoxy hardener, a color pigment additive and a silica filler for each of the component colors selected with an individually prepackaged composition of an epoxy resin and a silica filler.

2. The method of claim 1, wherein the prepackaged compositions comprising the epoxy hardener, color pigment additive and silica filler for the component colors are mixed with the prepackaged composition of the epoxy resin and silica filler in the package of the prepackaged composition of the epoxy resin and silica filler.

* * * * *